United States Patent Office 2,879,227
Patented Mar. 24, 1959

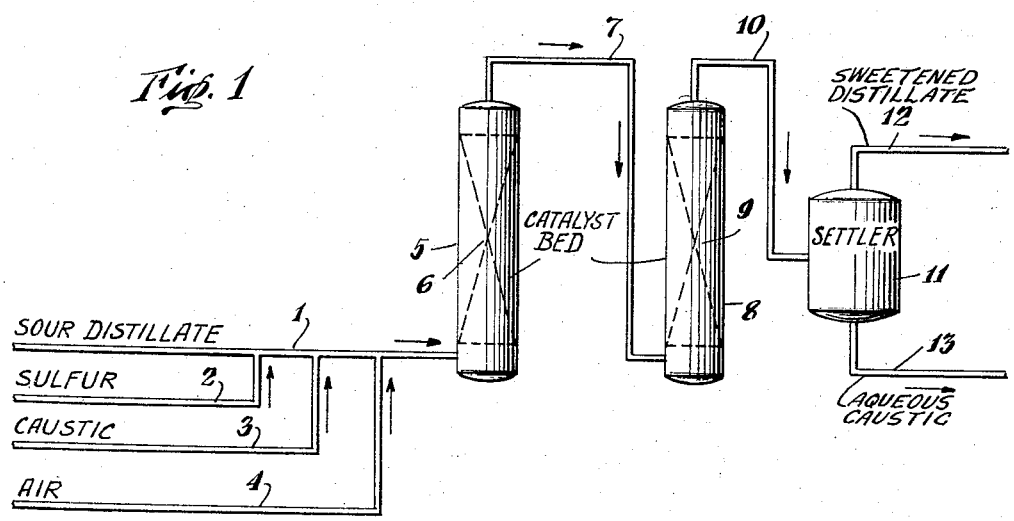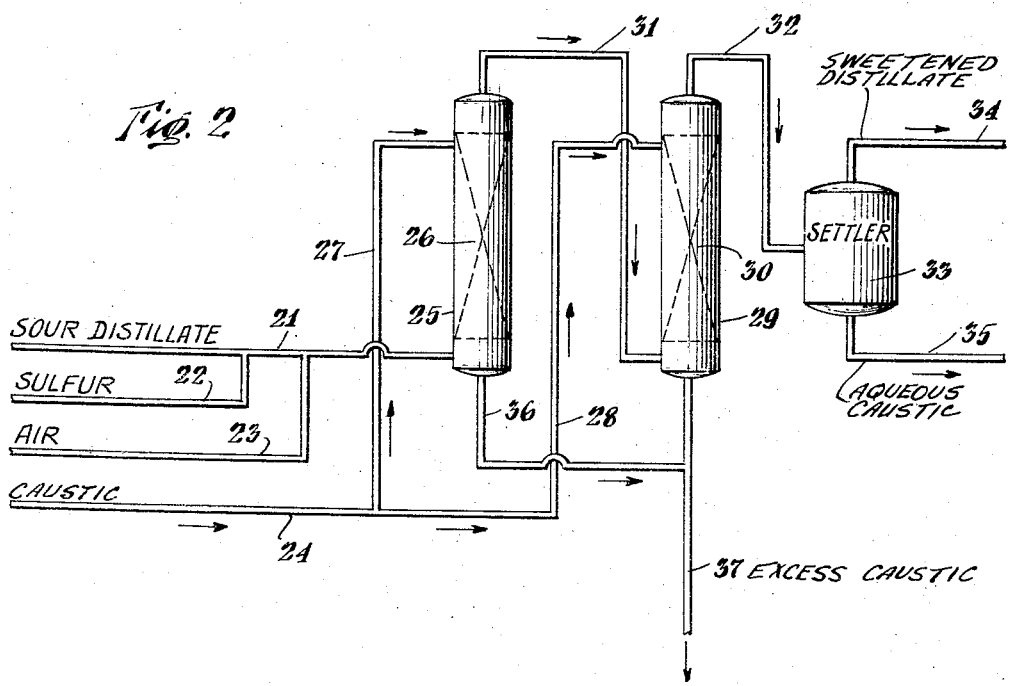

2,879,227

PROCESS FOR SWEETENING HYDROCARBONS WITH ELEMENTAL SULFUR CAUSTIC AND AIR IN THE PRESENCE OF A LEAD SULFIDE CATALYST

Frank W. Brooks, Jr., and Harry R. Sharpless, Jr., Beaumont, Tex., assignors, by mesne assignments, to Socony Mobil Oil Company, Inc., New York, N.Y., a corporation of New York Application May 24, 1957, Serial No. 661,319

2 Claims. (Cl. 208—198)

The present invention relates to the sweetening of petroleum fractions used as fuels including gasoline, kerosene and domestic heating oil and, more particularly, to the sweetening of petroleum fractions used as fuels by the addition of elemental sulfur to the fuel and contacting the fuel and added sulfur with free oxygen in the presence of a catalyst comprising lead sulfide.

As previously taught by prior art investigators, notably in U.S. Reissue Patent No. 22,135 of U.S. Patent No. 2,272,596, undesirable sulfur compounds can be removed from petroluem distillate by incorporating an amount of elemental sulfur not exceeding the amount of elemental sulfur required to combine with the aforesaid sulfur compounds but sufficient to combine with most of the aforesaid sulfur compounds, an alkaline compound in amount sufficient to render and maintain the distillate alkaline and finely dispersed oxygen and passing the resulting alkaline distillate containing elemental sulfur and finely dispersed oxygen in intimate contact with a lead sulfide catalyst in the absence of dispersed water and in the presence of not more than a small amount of added finely dispersed water.

The industrial application of this prior art method of sweetening petroleum distillate is illustrated by the highly schematic flow sheet set forth in Figure 1 of the drawings. Thus, sour distillate, e.g. kerosene, flows through conduit 1 at the rate of about 7 barrels per ton of catalyst per hour. Elemental sulfur in amount substantially stoichiometrically equivalent to the mercaptan content of the distillate to be treated and dissolved in petroleum distillate flows through line 2 to conduit 1 where it mixes with the distillate to be treated. An aqueous solution of alkali metal hydroxide, e.g. sodium hydroxide, having a density of about 6° Baumé flows through pipe 3 at the rate of 30 pounds of sodium hydroxide per 10,000 barrels of distillate to conduit 1 where it mixes with the mixture of distillate to be treated and elemental sulfur. Air at the rate of about 2 to 4 standard cubic feet per barrel of charge flows through pipe 4 to conduit 1 where it mixes with the mixture of the distillate to be treated, the elemental sulfur and the aqueous alkali metal hydroxide. The mixture of distillate to be treated, elemental sulfur, aqueous alkali metal hydroxide and air flows through conduit 1 to tower 5 having bed 6 of lead sulfide catalyst. The catalyst comprises a carrier such as sawdust but usually pebbles such as particles of slag coated or impregnated with lead salts and/or other compounds, e.g. lead sulfide and oxide.

The mixture of distillate to be treated, elemental sulfur, aqueous caustic and air flows upwardly through the bed of catalyst 6 in tower 5 and flows therefrom through conduit 7 to a second catalyst tower 8 containing a bed of the same type catalyst 9. From the catalyst tower 8 the mixture of distillate, elemental sulfur, aqueous caustic and air flows through conduit 10 to settler or coalescer 11 where the aqueous caustic settles out. The sweetened distillate flows from settler or coalescer 11 through line 12 while the aqueous caustic is withdrawn through line 13.

It can be readily established that unless the catalyst is substantially saturated with alkali metal hydroxide sweetening of the distillate is not achieved. The following log of a run presents the data establishing that in the absence of aqueous caustic the distillate is not sweetened.

*Characteristics of distillate charge*

Gravity, ° API _____ 42.0
Flash, TCC, ° F. _____ 120
Color, Saybolt _____ 21
RSH-S, wt. percent _____ 0.08
Sulfur, wt. percent _____ 0.50
ASTM distillation, ° F.:
    I.B.P. _____ 322
    10% _____ 354
    50% _____ 420
    90% _____ 510
    E.P. _____ 570

| Total Run Time, Hours | Conditions | Mercaptan Sulfur Content of First Tower Product, wt. percent |
|---|---|---|
| 0 | Charge rate=7 bbls. kerosene/Ton/Hr. Caustic Rate=30 lbs./10,000 bbls.[1] Air Rate=5 cubic ft./bbl. [21.9 cubic feet/lb./ (RSH-S)] Ratio sulfur to mercaptan sulfur=0.8 | Nil |
| 4 | Stopped Caustic Injection | Nil |
| 16 | Increased charge rate to 14 bbls./Ton/Hr. | Nil |
| 28 | Returned charge rate to 7 bbls./Ton/Hr. | 0.012 |
| 32 | Reduced Air Rate to 7.8 cubic feet/lb. (RSH-S) | Nil |
| 35 | Returned Air Rate to 21.9 cubic feet/lb. (RSH-S) | 0.02 |
| 37 | Removed catalyst from first tower and washed with water and alcohol to remove excess caustic | Nil |
| 48 | | 0.012 |
| 64 | | 0.031 |
| 68 | Caustic injection resumed at rate of 15 lbs/10,000 bbls | 0.043 |
| 70 | | Nil |
| 75 | | Nil |

[1] As an aqueous caustic solution having a density of 6° Baumé.

Employing the prior art method in the manner illustrated in Figure 1 and the reagent quantities set forth hereinafter for a kerosene containing 0.035 weight percent mercaptan sulfur (RSH-S) it was not possible to sweeten the kerosene when charged at a rate of 4.2 barrels of kerosene per ton of catalyst per hour.

Mercptan sulfur, wt. percent _____ 0.035

Distillate, percent:
    Panhandle—Fullerton _____ 12.0
    Mid-Continent sweet _____ 68.0
    West Texas sour _____ 20.0
                                                                       100.0

Charge rate, bbls./ton/hr. _____ 4.2
Ratio free sulfur to RSH-S, wt./wt. _____ 1.5/1.0
Caustic addition, lbs./10,000 bbls. _____ 15
Air rate, cubic feet/lb. (RSH-S) _____ 9.1
Mercaptan sulfur of treated distillate, wt. percent, hrs. 1–3 _____ 0.002–0.007
Mercaptan sulfur of treated distillate after 3 hours _____ 0.0075

It has now been discovered that the capacity of a unit operating in accordance with prior art practice as illustrated by the flow sheet Figure 1 can be increased eight fold by introducing the alkali metal hydroxide directly into the catalyst tower or towers rather than mixing the caustic solution with the distillate to be treated, elemental sulfur and air prior to introduction into the catalyst tower.

This modification of the prior conventional method of sweetening petroleum distillates as described in Reissue 22,135 is illustrated in a highly schematic manner in Figure 2.

In Figure 2 sour distillate is shown as flowing from a source not shown through conduit 21. Elemental sulfur in about the stoichiometric equivalent of the mercaptan content of the distillate to be treated, preferably suspended or dissolved in distillate, flows from a source not shown through pipe 22 to conduit 21 where it mixes with the sour distillate. Air flows from a source not shown through line 23 to conduit 21 where it mixes with the mixture of distillate to be treated and elemental sulfur.

The mixture of sour distillate, elemental sulfur and air containing no added alkali metal hydroxide, i.e., not alkaline, flows through conduit 21 to catalyst tower 25 containing catalyst bed 26.

Aqueous alkali metal hydroxide solution flows from a source not shown through pipes 24 and 27 and 28 to the top of towers 25 and 29. Preferably, the caustic solution is introduced into the towers at points immediately above the tops of the catalyst beds.

The mixture of sour distillate, elemental sulfur and air flows upwardly countercurrent to the downwardly flowing caustic solution. Thus, the mixture of sour distillate, elemental sulfur and air enters tower 25 at the bottom thereof. Caustic solution flows through pipes 24 and 27 to the top of tower 25. The caustic solution flows downwardly saturating the catalyst bed 26 in tower 25 while the mixture of sour distillate, elemental sulfur and air flows upwardly issuing from tower 25 through line 31.

The partially sweetened sour distillate, elemental sulfur and air flow from tower 25 through pipe 31 to the bottom of tower 29. Caustic solution flowing from a source not shown through lines 24 and 28 enters tower 29 in the region of the top thereof, preferably above the top of catalyst bed 30 and flows downwardly saturating the catalyst bed. The mixture of distillate, elemental sulfur and air flows upwardly through catalyst bed 30 issuing from tower 29 through conduit 32. The sweetened distillate, air and any entrained caustic solution flows through conduit 32 to settler or coalescer 33 where sweetened distillate is separated from entrained caustic solution. The sweetened distillate flows from settler or coalescer 33 through conduit 34 to water washing, addition of additives, other finishing step, storage and/or distribution. Separated caustic solution is withdrawn from settler or coalescer 33 through line 35. Excess caustic is drawn-off towers 25 and 29 through lines 36 and 37.

Illustrative of the advantages accruing from the addition of the caustic solution directly to the bed of catalyst rather than to the mixture of sour distillate, elemental sulfur and air prior to introduction of the mixture into the catalyst bed are the following data obtained when treating the kerosene described hereinbefore.

| Distillate | Caustic Added to Distillate | Caustic Added to Tower | |
|---|---|---|---|
| Mercaptan Sulfur, wt. percent | 0.035 | 0.035 | 0.080 |
| Distillate Charge Rate, b./t./hr | [1] 4.2 | 33.6 | 14 |
| Ratio elemental sulfur to RSH-S, wt./wt | 1.5/1.0 | 1.0/1.0 | 1.0/1.0 |
| Caustic addition, Lbs./10,000B | 15 | 15 | 15 |
| Air addition, cubic feet/lb./RSH-S | 23.1 | 23.1 | 23.1 |
| Treating Temperature, °F | 130 | 130 | 130 |
| Product RSH-S, wt. percent: | | | |
| 4 hrs | 0.0075 | Nil | Nil |
| 34 hrs | | Nil | Nil |

[1] When caustic solution was added to the mixture of sour distillate containing 0.035 wt. percent RSH-S, elemental sulfur and air the distillate could not be sweetened at a charge rate of 4.2 barrels per ton of catalyst per hour for periods longer than three to four hours.

It will be noted that, while distillate containing 0.035 weight percent mercaptan sulfur could not be sweetened at the charge rate of 4.2 barrels per ton of catalyst per hour for more than four hours when the caustic solution was added to the sour distillate, when the caustic solution was introduced directly into the catalyst tower sour distillate of the same mercaptan content (0.035 wt. percent) can be treated at 8 times the flow rate $$\left(\frac{33.6}{4.2}=8\right)$$

or sour distillate containing 2.28 times mercaptan sulfur $$\left(\frac{0.080}{0.035}=2.28\right)$$

can be treated at 3.33 times the flow rate $$\left(\frac{14}{4.2}=3.33\right)$$

or 7.6 times as much mercaptan-sulfur can be removed.

The amount of alkali metal hydroxide solution introduced into each catalyst tower is at least sufficient to keep the catalyst bed saturated with alkali metal hydroxide solution. In general, aqueous alkali metal hydroxide solutions containing about 2.0 to about 10.0 percent by weight of alkali metal hydroxide (NaOH, KOH, NH$_4$OH) are used in amounts of about 1.0 to 10.0 pounds of alkali metal hydroxide per 1000 bbls. of distillate to be treated or about 0.143 to about 1.43 pounds of alkali metal hydroxide per ton of catalyst.

The air rate is about 4.5 to about 27.2 cubic feet of air (0.95 to 5.72 cubic feet of oxygen) per pound of mercaptan sulfur in the distillate.

The amount of elemental sulfur is about 1 to about 2 stoichiometric equivalents of the mercaptan sulfur as calculated from the equation $$2RSH + S \rightarrow H_2S + RSSR$$

Treating temperatures of about 90 to about 150° F. can be used.

We claim:

1. A method of sweetening petroleum distillates which comprises mixing a petroleum distillate containing mercaptans with an amount of elemental sulfur at least substantially stoichiometrically equivalent to the mercaptan content of said distillate and not greater than about 2 times said stoichiometrically equivalent amount and free oxygen-containing gas, contacting said mixture of distillate, elemental sulfur and air with a bed of solid catalyst comprising lead compounds selected from the class consisting of lead sulfide and lead oxide dispersed on a carrier in the presence of aqueous alkali metal hydroxide introduced directly into said bed of catalyst.

2. In the method of removing undesirable sulfur compounds from a petroleum distillate which comprises incorporating in the distillate an amount of elemental sulfur not exceeding the amount of elemental sulfur required to combine with said sulfur compounds but sufficient to combine with most of said sulfur compounds, an alkaline compound in an amount sufficient to render and maintain the distillate alkaline and finely dispersed oxygen, and passing the resulting alkaline distillate containing elemental sulfur and finely dispersed oxygen in intimate contact with a lead sulfide catalyst in the absence of undispersed water and in the presence of not more than a small amount of added finely dispersed water, the improvement which comprises not incorporating said alkaline compound in the distillate but introducing the alkaline compound directly into the bed of lead sulfide catalyst.

References Cited in the file of this patent

UNITED STATES PATENTS

| Re. 22,135 | Bender | July 21, 1942 |
| 2,102,796 | Happel et al. | Dec. 21, 1937 |
| 2,272,594 | Bender | Feb. 10, 1942 |